United States Patent
Stapp

[15] 3,669,992

[45] June 13, 1972

[54] PREPARATION OF AMINOTETRAHYDROPYRANS

[72] Inventor: Paul R. Stapp, Bartlesville, Okla.

[73] Assignee: Phillips Petroleum Company

[22] Filed: April 18, 1968

[21] Appl. No.: 722,193

[52] U.S. Cl. ................260/345.1, 424/283, 260/583 G, 260/293.72
[51] Int. Cl. .............................................C07d 7/04
[58] Field of Search................................260/345.1

[56] References Cited

UNITED STATES PATENTS 3,419,555  12/1968  Jenkins...........................260/345.1 X

OTHER PUBLICATIONS

Eliel et al., J. Org. Chem., vol. 30, pp. 2,450– 2,451 (1965) QD 241.J6

Primary Examiner—John M. Ford
Attorney—Young and Quigg

[57] ABSTRACT

Aminotetrahydropyrans are prepared by reacting halotetrahydropyrans with ammonia or certain primary or secondary amines in the presence of water and an alcohol generally within a temperature range of from 100° to 500° C. These aminotetrahydropyrans and useful as spasmolytic antihistamine drugs.

8 Claims, No Drawings

PREPARATION OF AMINOTETRAHYDROPYRANS

This invention relates to amination. In another aspect, this invention relates to the preparation of aminotetrahydropyrans from chlorotetrahydropyrans.

Various methods for synthesizing aminotetrahydropyrans are known in the art. For example, it is known that 2-hydroxytetrahydropyran can be reacted with ammonia in the presence of a strong base and at a low temperature to yield 2-aminotetrahydropyran. Such other processes as the reaction of tetrahydropyran-4-carboxylic acid with $NaN_3$ to yield 4-aminotetrahydropyran are also known.

Heretofore, chlorotetrahydropyrans have not been utilized as starting materials for the production of aminotetrahydropyrans.

One object of this invention is to provide a novel amination reaction.

Another object of this invention is to provide a novel process for the conversion of halotetrahydropyrans to aminotetrahydropyrans.

Another object of this invention is to provide a novel process for producing aminotetrahydropyrans which are useful as spasmolytic and antihistaminic drugs.

According to this invention, I have discovered that ammonia and certain primary and secondary amines can be reacted with halotetrahydropyrans to yield aminotetrahydropyrans when the reaction is carried out in the presence of water and alcohol.

The halotetrahydropyran compounds which can be utilized according to the process of this invention have the general formula:

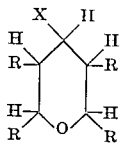

wherein X is a halogen, e.g., chlorine, fluorine, bromine, or iodine, and the R radicals are selected from hydrogen, and alkyl or cycloalkyl radicals having to and including 17 carbon atoms per R radical, and wherein the total carbon atoms of all of the alkyl and cycloalkyl radicals does not exceed 20 carbon atoms per molecule.

The halotetrahydropyran compounds employed in this invention can be prepared by any means known in the art. Particularly preferred are the 4-halotetrahydropyrans and 3-alkyl-4-halotetrahydropyrans described by the above generic formula. A preferred method of preparing these preferred 4-halotetrahydropyrans and 3-alkyl-4-halotetrahydropyrans is by reaction of a terminal olefin, paraformaldehyde, and a hydrogen halide at a temperature within the range of from −150° to 250° C.

Examples of suitable halotetrahydropyran compounds include 4-chlorotetrahydropyran, 4-bromotetrahydropyran, 4-iodotetrahydropyran, 4-fluorotetrahydropyran, 3-pentyl-4-chlorotetrahydropyran, 3-heptyl-4-chlorotetrahydropyran, 3-methyl-4-chlorotetrahydropyran, 3-nonyl-4-chlorotetrahydropyran, 2-chlorotetrahydropyran, 3-chlorotetrahydropyran, 3-heptadecyl-4-chlorotetrahydropyran, 2-propyl-3-heptadecyl-4-bromotetrahydropyran, 2-chloro-3-(4-methyl-5-ethyloctyl)-4-cyclohexyl-6-propyltetrahydropyran, 2-cyclododecyl-4-chloro-6-cyclohexylethyltetrahydropyran, 2-methyl-3-chloro-5-(4-propylcyclodecylethyl)-tetrahydropyran, and the like.

The above-described halotetrahydropyran compounds can be reacted according to this invention with a second compound having the generic formula:

wherein R' is selected from hydrogen; radicals selected from alkyl, cycloalkyl, aryl, or combinations thereof such as aralkyl, alkaryl, and the like having in the range of one to 12 carbon atoms per group; and organic groups having a range of from one to 12 carbon atoms and from 1 to 2 tertiary nitrogen atoms per group, e.g., nitrogen atoms bonded to two or three carbon atoms but not to any hydrogen atoms, for examples, pyridyl.

Suitable examples of said second compound include ammonia, methylamine, dimethylamine, ethylamine, diethylamine, propylamine, dipropylamine, butylamine, dibutylamine, pentylamine, dipentylamine, octylamine, dioctylamine, dodecylamine, didodecylamine, cyclododecylamine, aniline, 2-naphthylamine, 4-biphenylamine, 2-acenaphthenylamine, 4-aminopyridine, benzylamine, 2-tolylamine, 2,4-xylylamine, mesitylamine, 3-cumenylamine, dibenzylamine, di(4-biphenyl)amine, 2-aminopyridine, di(2-pyridyl)amine, 6-cyclohexylhexylamine, 4-hexylcyclohexylamine, di(3-hexylcyclohexyl)amine, and the like.

In order to carry out the reaction between the halotetrahydropyrans and ammonia or the amine compounds, the presence of at least a small amount of water and alcohol is necessary in the reaction mixture. Suitable alcohols can be represented by the formula $R''-(OH)_n$ wherein $R''$ can be alkyl, cycloalkyl, aryl, or combinations thereof such as aralkyl, alkaryl, and the like having a valence of n and having in the range of from about one to 20 carbon atoms; and wherein $n$ is an integer in the range of from about 1 to 5. Suitable alcohols include methanol, ethanol, propanol, 2-propanol, butanol, 2-methylpropanol, 1,2-ethanediol, 1,2-propanediol, phenol, cyclopentanol, tricontanol, 1,3,5,7,9-tricontanepentol, 2-naphthol, 1,12-dodecanediol, 1,2-cyclohexanediol, 1,5-naphthalenedimethanol, o-cresol, glycerol, erythritol, pentaerythritol, 1,3,6-hexanetriol, cyclododecanol, 3-heptyl-5-ethyl-6-ethyl-1,3,4,6,10-decanepentol, 8-cyclooctyldecanol, 6-hexylcyclododecanol, and the like.

Generally, it is preferred that at least about 5 parts by weight of water and at least about 5 parts by weight of an alcohol must be present for each 90 parts by weight of halotetrahydropyran compound present in the reaction mixture. Even more preferably, 10 to about 100 parts by weight of water and 10 to about 100 parts by weight of alcohol are to be present for each 100 parts by weight of halotetrahydropyran in the reaction mixture. However, it is to be understood that portions of alcohol and water above and below these preferred ranges can also be used to carry out the process of this invention. Mole ratios of ammonia or amines to the halotetrahydropyrans within the range of from about 1:1 to about 20:1 can be employed. Generally, an excess of ammonia or amines beyond the equivalent amount is desirable. Normally, I prefer to employ sufficient ammonia or amines so that about 10–15 moles of ammonia or amines are present for each mole of halotetrahydropyran.

The process of this invention can be effected in conventional equipment by conventional techniques. Temperatures in the range of from about 100° to 500° C. can be employed. Normally, I prefer to employ temperatures in the range of about 150° to 250° C. Normally, atmospheric pressure is preferred because of convenience, but pressures in the range of 1 to 100 atmospheres can be employed. The reaction can be effected for a sufficient time to carry out the degree of conversion desired. Generally, reaction times in the range of from about 10 minutes to about 48 hours are suitable.

If desired, diluents can be employed along with the water-alcohol mixture in the process of this invention; however, it is preferred that only the water-alcohol mixture be employed. Suitable diluents that can be used along with the water-alcohol mixture include ethers and hydrocarbons such as, for example, diethyl ether, dimethyl ether, pentane, hexane, cyclohexane, tetrahydropyran, tetrahydrofuran, methyl ethyl ether, and the like. Sufficient diluent can be employed concurrently with the water-alcohol mixture to comprise 5 to 95 percent by weight of the reaction mixture. I normally prefer to employ sufficient diluent to comprise about 10 to about 40 percent by weight of the reaction mixture.

This invention can be better understood from a study of the following examples.

EXAMPLE I

A stirred reactor was charged with 150 parts by weight of 4-chlorotetrahydropyran, 45 parts by weight of water, and 436 parts by weight of 2-propanol. The reactor was sealed, pressure tested, flushed with nitrogen, and vented. Next, 178 parts by weight of ammonia was charged to the reactor, and the reaction mixture was heated and stirred at 200° C. for 5 hours, cooled, and vented. After opening, the contents were transferred to a mixing vessel, stirred with 65 parts by weight of sodium hydroxide for 1 hour, and filtered. The inorganic salts were washed with ether, and the combined filtrates were fractionated to remove solvent. Fractional distillation of the residue gave 37.3 parts by weight (30 percent yield) of 4-aminotetrahydropyran, boiling point: 142°–151°C.

Infrared analysis of the product showed it to be 4-aminotetrahydropyran.

Examples II and III demonstrate that ordinary amination suitable for the amination of the alkyl halides is not suitable for the amination of the halotetrahydropyrans.

EXAMPLE II

A reactor was charged with 120.5 parts by weight of 4-chlorotetrahydropyran, 56 parts by weight of KOH pellets and 177 parts by weight of ethyl ether. The reactor was sealed, pressure tested, flushed with nitrogen, and vented. Then 202.2 parts by weight of ammonia were added, and the reactor contents were heated and stirred at 79.4° C. for 7 hours, cooled, and vented. The reactor contents were filtered, volatiles were stripped, and the residue was distilled to recover 49.1 parts by weight of 5,6-dihydro-2-(H)pyran, bp 90°–93° C. No 4-aminotetrahydropyran was detected.

EXAMPLE III

A stirred reactor was charged with 120.5 parts by weight of 4-chlorotetrahydropyran and 118 parts by weight of 2-propanol. The reactor was sealed, pressure tested, flushed with nitrogen, and vented. Next, 203.7 parts by weight of ammonia were charged, and the reactor contents were heated to 200° C. for 3 hours, cooled and vented. Then 60 parts by weight of finely powdered KOH were added. After stirring for 1 hour, the resulting material was filtered, stripped of volatiles, and distilled. Only 4-chlorotetrahydropyran was recovered. No 4-aminotetrahydropyran was detected.

Thus, Examples II and III demonstrate that ordinary amination conditions suitable for the conversion of alkyl halides is not suitable for the amination of the halotetrahydropyrans. Furthermore, these examples in conjunction with Example I, illustrate a surprising discovery that the presence of both water and alcohol are necessary for the conversion process of this invention.

While the aminotetrahydropyran compounds produced by the process of this invention can be used as accelerators (promoters) or catalysts for curing of epoxy resins with a dithiol, Example IV illustrates that 4-dimethylaminotetrahydropyran, and 4-aminotetrahydropyran can be utilized as intermediates to form useful spasmolytic and antihistaminic drugs.

EXAMPLE IV

Cerkovnikov, Stern, and Marijan, Arhiv Kem. 18, (1946) [CA-42, 3394-6(1948)], disclose that Irenal (4-dimethylamino-1-phenylpiperidine) shows definite potency as an antihistaminic drug and has spasmolytic action. This reference also discloses that 4-dimethylamino-1-methyl-piperidine exhibits antihistaminic properties.

The above reference discloses that such compounds are prepared according to the reaction sequence illustrated as follows:

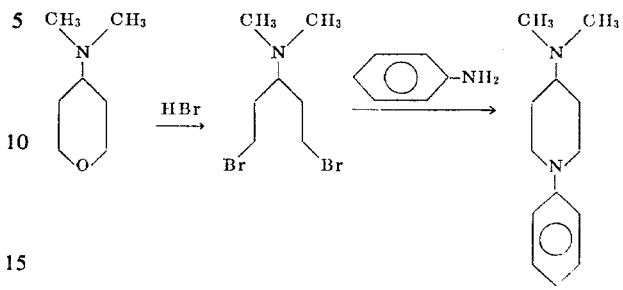

Thus, 4-dimethylaminotetrahydropyran is disclosed to be a useful intermediate for the production of the above-described drugs.

4-Dimethylaminotetrahydropyran can be produced according to the process of my invention by reacting dimethylamine with 4-chlorotetrahydropyran according to the above-described reaction conditions, or such compounds can be prepared by the conversion of 4-aminotetrahydropyran which is produced by the process of this invention. For example, a mixture of 10 parts by weight of 4-aminotetrahydropyran product from Example I in 23 parts by weight of 97 percent formic acid was prepared, and 18 parts by weight of 36.6 percent aqueous formalin was added thereto. The mixture was refluxed for 12 hours. Ten parts by weight of concentrated HCl were added, and the reaction mixture was evaporated to dryness. The resulting solid was dissolved in a small amount of water, made strongly alkaline with 50 percent KOH solution, and saturated with potassium carbonate. An ether extract was dried over KOH pellets and filtered. The ether was stripped, and the residue was distilled at reduced pressure to give 11.4 parts by weight of 4-dimethylaminotetrahydropyran, bp, 71°–72 C. (26 millimeters mercury).

As will be readily apparent to those skilled in the art from reading of this application, various changes and modifications may be made in the above-described process.

I claim:

1. A process for producing 4-aminotetrahydropyran having the formula:

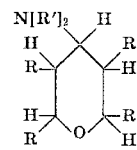

wherein the R radicals are selected from hydrogen, and alkyl radicals having one to 17 carbon atoms per R radical or cycloalkyl radicals having three to 15 carbon atoms per R radical, and wherein the total carbon atoms of all of the alkyl and cycloalkyl radicals does not exceed 20 carbon atoms per molecule comprising reacting (1) a compound having the formula:

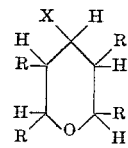

wherein X is a halogen, and the R radicals are as represented hereinbefore, with (2) a compound having the formula:

wherein each R' is selected from hydrogen, hydrocarbon radicals selected from alkyl having one to 12 carbon atoms per R' radical, cycloalkyl having three to 12 carbon atoms per R' radical, phenyl, naphthyl, and combinations thereof having up to 12 carbon atoms, and pyridyl, said reaction occurring in the presence of water and alcohol having the formula $R''-(OH)_n$ wherein $R''$ is an alkyl group having one to 12 carbon atoms, a cyclo alkyl group having three to 12 carbon atoms, phenyl, naphthyl, and combinations thereof having up to 20 carbon atoms and having a valence of n wherein $n$ is an integer in the range of from 1 to 5, wherein the weight ratio of water:alcohol varies from 10:100 to 100:10.

2. The process of claim 1 wherein at least 5 parts by weight of water and at least 5 parts by weight of said alcohol are present for each 90 parts by weight of said first compound.

3. The process of claim 1 wherein said reaction occurs at a temperature in the range of from 100° to 500° C., and a pressure between 1 and 100 atmospheres.

4. The process of claim 1 wherein the mole ratio of said second compound to said first compound is within the range of from about 1:1 to 20:1.

5. The process of claim 1 wherein said first compound is selected from 4-halotetrahydropyrans, and 3-alkyl-4-halotetrahydropyrans.

6. The process of claim 5 wherein said first compound is 4-chlorotetrahydropyran.

7. The process of claim 6 wherein said second compound is ammonia.

8. The process of claim 7 wherein said alcohol is 2-propanol.

* * * * *